United States Patent [19]

Fortmeyer

[11] 4,318,632
[45] Mar. 9, 1982

[54] RETRACTABLE WHEEL ATTACHMENT FOR BOAT LIFT

[76] Inventor: George W. Fortmeyer, 1905 W. Ryan Ave., Roseville, Minn. 55113

[21] Appl. No.: 152,515

[22] Filed: May 22, 1980

[51] Int. Cl.³ .............................................. B60P 1/00
[52] U.S. Cl. ..................................... 405/3; 280/414.1
[58] Field of Search .......... 405/3; 280/414 R, 414 A, 280/414 B; 9/1.2; 173/23

[56] References Cited

U.S. PATENT DOCUMENTS

| | | | |
|---|---|---|---|
| 2,294,110 | 8/1942 | Donaldson | 280/80 X |
| 2,496,599 | 2/1950 | Rivers | 9/1.2 X |
| 2,529,948 | 11/1950 | Jones | 405/3 X |
| 3,077,742 | 2/1963 | Brown | 405/3 |
| 3,169,644 | 2/1965 | Godbersen | 9/1.2 X |
| 3,462,781 | 8/1969 | Olvera | 9/1.2 |
| 3,753,355 | 8/1973 | Knoch | 405/3 |
| 3,759,409 | 9/1973 | Wenzel | 414/460 |
| 3,768,677 | 10/1973 | Moss | 280/414 A X |
| 3,807,591 | 4/1974 | Zinno | 414/460 |

Primary Examiner—Ernest R. Purser
Attorney, Agent, or Firm—Orrin M. Haugen; Thomas J. Nikolai

[57] ABSTRACT

An attachment for a boat lift to facilitate its placement and/or removal from a dockside location. A boat lift for small pleasure boats generally comprises a stationary framework which supports a movable boat supporting member and a winch or equivalent mechanism for elevating and lowering the boat supporting member relative to the stationary framework. The present invention comprises a set of wheels which are mounted on the stationary frame and normally retracted when it is desired that the boat lift rest upon the lake bottom or on shore. When it is desired to reposition the boat lift itself, a coupling is established between the wheel assembly and the boat supporting member so that when the boat lift's own winch mechanism is operated, the wheels are extended causing the weight of the boat lift to be supported on the wheels rather than upon the ground.

7 Claims, 5 Drawing Figures

RETRACTABLE WHEEL ATTACHMENT FOR BOAT LIFT

BACKGROUND OF THE INVENTION

I. Field of the Invention:

This invention relates generally to an improvement for a conventional boat lifting device, and more specifically to a wheel mechanism which, when used in conjunction with such a boat lift, facilitates the placement and removal of the lift at dockside.

II. Discussion of the Prior Art:

Owners of pleasure boats and the like find it convenient to have a boat lift next to a dock so that when the boat is not in use, it can be drawn out of the water and thereby protected from damage which might otherwise occur due to storms and attendant wave action. In northern climates, it is generally necessary to remove the boat lift from its dockside location in the fall of the year to prevent damage to the lift itself by ice during the winter months. Then, in the spring of the year, it is again necessary to transport the boat lift from its location on shore back to its dockside location.

Most boat lift devices of which I am familiar are comprised of a stationary framework having first and second parallel, spaced apart side members, this stationary framework generally designed to rest directly upon the ground or lake bottom. Then, suspended from this stationary frame is a boat supporting mechanism which is relatively movable in a vertical direction with respect to the stationary framework so that a boat resting on the supporting mechanism may be raised out of the water or lowered into the water through the operation of a winch or the like. Such a conventional boat lift is depicted and described in the Brown U.S. Pat. No. 3,077,742. Still another prior art boat lift with which the improvement of the present invention may be typically used is the Model WRS 9016 sold by Weeres Industries, Inc. of St. Cloud, Minn. Each of these prior art arrangements includes a generally rectangular horizontal frame having parallel, spaced apart side members and vertical posts extending upwardly therefrom, the side members adapted to rest directly on the lake bottom when the boat lift is positioned dockside. This stationary framework, then, supports a boat supporting member which can be effectively raised or lowered relative to the stationary frame and the water surface.

Because of the weight of the boat lift and its size and constructional configuration, it is normally necessary to have four or more persons involved in any attempt to position the boat lift at dockside in the spring of the year or to remove it from its dockside position and place it on land prior to the onset of winter. I have devised a simple, low cost mechanism which may readily be attached to a conventional boat lift whereby a single person may perform the installation and removal task. Specifically, my improvement comprises a retractable and extendable wheel mechanism which when in its retracted condition permits the stationary framework of the boat lift to rest upon the lake bottom or on ground. However, when it is desired to move the lift assembly, the same winch mechanism used to raise and lower the boat supporting member can be made to deploy the wheel assembly so that the weight of the boat lift is supported on wheels, allowing ease of movement.

SUMMARY OF THE INVENTION

The wheel attachment of the present invention comprises a pair of arms designed to operate as levers of the first class. Specifically, the arms are provided with a pivot connection proximate their midpoints, the pivot connection on a given arm being made to a respective one of the spaced apart side members of the stationary framework at a predetermined location along the length of this framework. Disposed on the lower end of each arm is an axle on which a conventional tire, such as an automobile or trailer tire, may be journaled for rotation. At the other end of each arm is a means for coupling that end to the movable boat supporting member of the boat lift. Thus, when it is desired to deploy the wheels to facilitate transporting the boat lift, the operator merely operates the winch assembly on the boat lift causing the arms to rotate about their central pivots and causing the stationary framework to be lifted from its ground contacting position so that it is now supported on the wheels. The wheel assembly is preferably positioned such that when fully deployed, the center of gravity of the boat lift structure will be aligned with the wheel axles, thereby allowing ease of balance.

OBJECTS

It is accordingly the principal object of the present invention to provide an attachment for a boat lift to facilitate its movement to and from a dockside location.

Another object of the invention is to provide a wheel attachment for a boat lift which is retractable and extensible.

A still further object of the invention is to provide a wheel attachment for a boat lift which is retractable and extensible and in which the required power for extending the wheel attachment is provided by the existing boat lifting winch mechanism.

A still further object of the invention is to provide a wheel attachment for a boat lift which is relatively low in cost and easy to install and which is generally maintenance free over long periods of useful life.

These and other objects and advantages of the invention will become apparent to those skilled in the art from the following detailed description of a preferred embodiment when considered in conjunction with the accompanying drawings in which like numerals in the several views refer to corresponding parts.

DESCRIPTION OF THE PREFERRED EMBODIMENT

Figure 1:
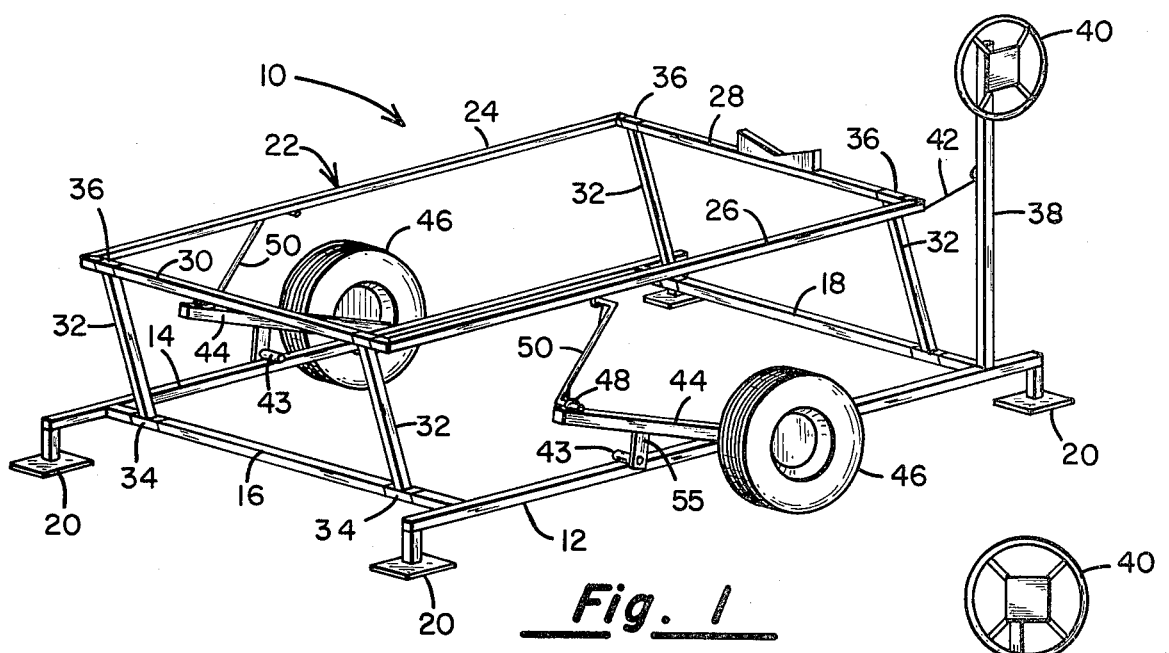
FIG. 1 is a perspective view showing the manner in which the wheel attachment of the present invention may be utilized with a conventional boat lift.

Referring first to FIG. 1, there is indicated generally by numeral 10 a boat lift apparatus incorporating the wheel attachment of the present invention. Specifically, the boat lift apparatus comprises a generally stationary frame including spaced apart side members 12 and 14 which are held together by cross members 16 and 18. The stationary frame member, when not being transported, normally rests upon ground or upon a lake bottom on the pads 20.

The boat lift 10 further includes a boat supporting frame indicated generally by numeral 22 which includes in the arrangement illustrated parallel side members 24 and 26 which are held relative to one another by the cross members 28 and 30.

The movable boat supporting member 22 is coupled to the stationary frame so that it may be raised and lowered relative thereto. Specifically, in the embodiment shown in FIG. 1, connecting struts 32 are pivotally coupled between the cross members 16-18 of the stationary frame and cross members 28 and 30 of the movable frame 22 which comprises the boat lifting member. The pivotal connection is achieved by disposing a generally cylindrical rod (not shown) through the tubular end portions 34 and 36 of the struts 32 with the cylinders extending beyond the end edges of the tubular members 34 into the mating ends of the cross members 16-18 and 28-30.

Mounted upon the stationary frame at the forward end of the boat lift is a vertical post 38 which extends generally perpendicular to the plane defined by the side members 12 and 14. The height of the post 38 is such that the end thereof is at a convenient height above a dock surface against which the boat lift is generally placed. Disposed at the upper end of the vertical post 38 is a winch mechanism including a handwheel 40 which may be operated to wind and unwind a cable 42 about a reel or drum (not shown). Alternatively, the winch mechanism may be motor operated rather than a manual device. It would also normally include a conventional ratchet mechanism to permit latching of the wheel or drum at any desired location. The end of the cable 42 is secured to the movable frame 22 and routed so that it can be used to apply a force thereto tending to allow clockwise and counterclockwise rotation of the boat lift member 22 relative to the stationary frame when the cable is wound upon the reel of the winch or played out therefrom, respectively. When the cable is played out, the movable frame 22 is in a lowered orientation relative to the stationary frame and would typically be beneath the surface of the water a predetermined distance so that a pleasure boat or the like can be maneuvered onto the boat supporting member 22. Then, when the winch is operated to wind the cable 42 upon its drum, the boat supporting member with the boat upon it will be raised relative to the stationary frame and the boat will be lifted out of the water.

The description thus far is of a conventional boat lift with which the present invention may find use. However, the invention is not limited to a boat lift having the same construction as that described above. As will be set forth in greater detail hereinbelow, various forms of boat lifts may be modified to incorporate the present invention.

Concerning the wheel attachment itself, shown affixed to the stationary side members 12 and 14 at a location proximate the midpoint of these side members is a pivot connection 43 for an elongated arm 44 having a wheel 46 journaled for rotation at one end thereof. At the opposite end of the arm 44 from the wheel 46 is an eye bolt 48 into which is adapted to be fitted a linkage member 50 which extends and which is arranged to be fitted into a similar eye bolt secured to the frame member 26 of the boat lift member 22.

Figure 3:
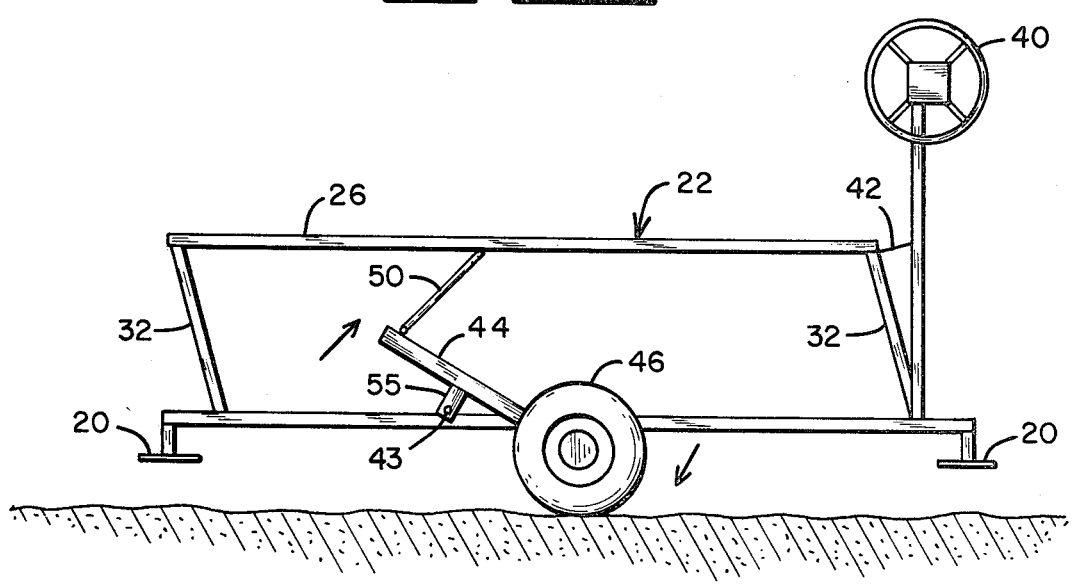
FIG. 3 is a right side view showing the wheel attachment in its extended position.
Figure 4:
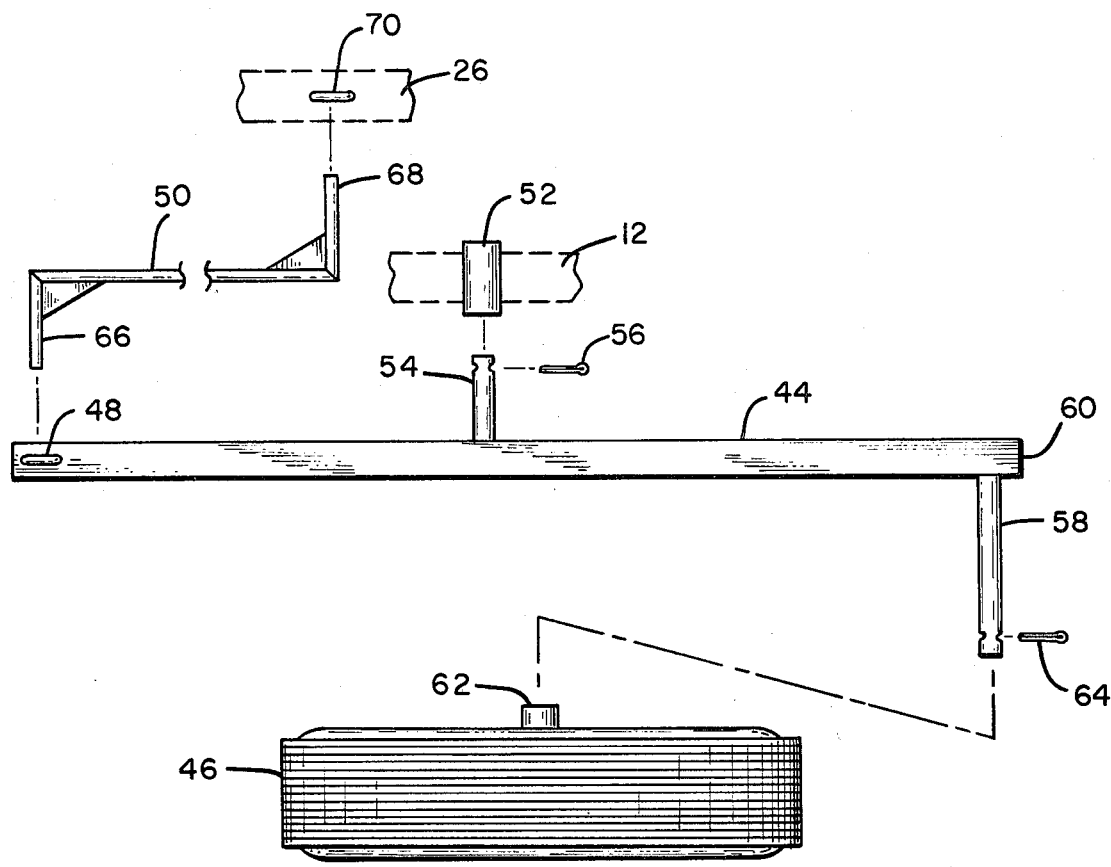
FIG. 4 is a blown apart view of the wheel assembly forming a preferred embodiment.

Referring next to FIG. 4, the specifics of the construction of the wheel attachment will be set forth. In this figure the stationary frame members 12 is shown in dotted line representation as is the upper side rail 26 of the boat lift member 22. Welded or otherwise affixed to the stationary frame member 12 is a short length of cylindrical tubing 52 which has its central axes disposd perpendicular to the longitudinal axis of the frame member 12. The elongated arm 44 is shown as having a cylindrical projection 54 located proximate its midpoint but offset from the longitudinal axis of the arm 44 by a connecting stub 55 as can best be seen in FIGS. 1-3. The projection 54 is arranged to slidingly fit within the tubular element 52 so that the arm may be rotated about the projection 46 as an axis. A cotter key 56 may conveniently be used to hold the projection 54 within the tubular housing 52 to prevent inadvertent dislodgement of the pivot connection.

With continued reference to FIG. 4, the arm 44 also has a cylindrical extension 58 extending outwardly and normal to the arm 44 at a point proximate a first end 60 thereof. The cylindrical projection 58 serves as an axle for the tire 46 which is provided with a cylindrical tubular hub 62. Again, the projection 58 may be fitted within the hub 62 and a cotter key 64 used to hold the tire in place on the axle 58.

Disposed at the opposite end of the arm 44 is an eye bolt 48 whose annular opening is sufficiently large to slidingly receive the end portion 66 of the removable linkage 50. The linkage 50 has a further cylindrical offset end piece 68 extending perpendicularly therefrom and in a direction generally opposed to the direction of the extension 66, the end 68 adapted to slidingly fit within the annular opening of an eye bolt 70 which is secured to the side member 26 of the movable boat supporting member 22. The length of the offset ends 66 and 68 of the linkage member 50 are dimensioned to take into account the fact that the movable frame 22 is somewhat more narrow than the stationary frame to which it is pivotally secured.

Now that the details of the construction of the wheel attachment have been set forth, consideration will be given to the mode of operation.

Figure 2:
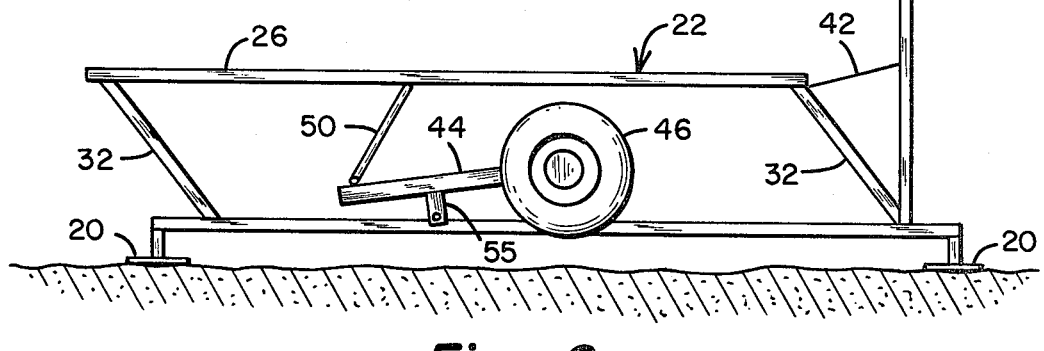
FIG. 2 is a right side view of the assembly of FIG. 1 showing the wheel attachment in its retracted position.

With reference to FIGS. 2 and 4, the movable frame 22 is shown in its lowered orientation and with the rigid linkage 50 coupled between the eye bolt 48 on the arm 44 and the eye bolt 70 on the frame member 26. With the cable 42 played out from its winch drum (not shown) the weight of the boat supporting member 22 is sufficient to maintain the tire 46 elevated with respect to the ground on which the base pads 20 rest. The offset provided by stub 55 gives a clearance from the lake bottom of both the wheel and the other end of the arm 44 when the wheel is in its retracted condition.

When it is desired to relocate the boat lift mechanism, the user couples the linkage 50 between the eye bolts 48 and 70 and then operates the winch to elevate the boat supporting member 22. In doing so, the arm 44 will be pivoted about the pivot point 43 and the wheel 46 will be brought into contact with the surface of the ground. Continued operation of the winch will cause the base pads 20 to be lifted from the ground so that the boat lift will be supported entirely by the wheel assembly. As such, a person will be able to move the entire boat lift by rolling it on its wheels. It is apparent that by proper dimensioning of the arm 44 and placement of the pivot point 43 along its length, it is possible to obtain any desired elevation of the boat lift assembly relative to the ground, assuming sufficient mechanical advantage can be obtained from the winch mechanism to operate the lever arm 44.

Of course, when during the boating months the user wishes to operate the lift in a conventional fashion, he merely needs to disconnect the linkage 50 from the upper movable boat supporting frame member 22. Then, the raising and lowering of the movable boat supporting frame by the winch will have no affect on the orientation or disposition of the wheel assembly.

Those skilled in the art will readily visualize ways in which the present invention may be applied to boat lifts of types differing from that specifically illustrated herein. For example, the rigid linkage 50 may be replaced with a flexible chain or cable so long as a positive stop member is welded to the stationary frame at a location which will prevent the arm 44 from rotating past the vertical position as the movable boat supporting member is elevated.

Figure 5:
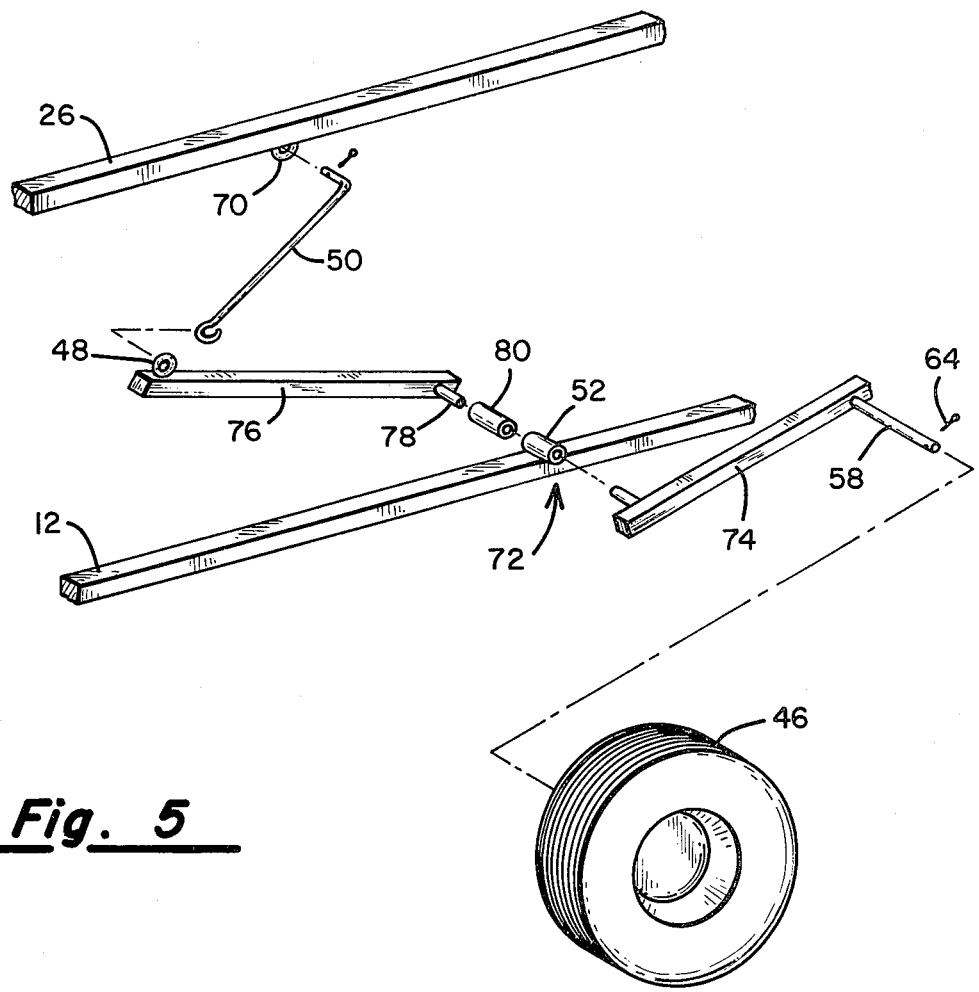
FIG. 5 is a blown apart view of an alternative wheel assembly arrangement.

Another variation of the wheel attachment is illustrated in the blown apart perspective view of FIG. 5. Specifically, the arm configuration 44 of FIG. 4 has been modified slightly to compensate for the fact that some boat lifts which are on the market have substantially narrower movable frames 22 relative to the stationary frame 12–18 as depicted in FIGS. 1–3. Then too, it is common to find structural bracing extending diagonally between the stationary frame member 12 and the vertical winch post 38. The wheel and arm configuration of FIG. 5 is designed so as to not interfere with that structure. The arm configuration 72 of FIG. 5 comprises first and second rod-like segments 74 and 76 which are maintained in a spaced apart relationship by an offset connection 78 of a length which is sufficient to span the distance between the stationary frame member 12–14 and the movable frame members 24 and 26 and still provide sufficient clearance between the outermost arm segment 74 and any structural bracing joining the stationary side member 12 to the winch post 38. A tubular spacer 80 may be placed about the cylindrical offset 78 so as to be disposed between the arm segment 76 and the cylindrical pivot 52 to preclude sidewise displacement of the arm assembly relative to the hub 52.

As before, the wheel 46 is arranged to be mounted on an axle 58 projecting outwardly from the arm segment 74 and held in place by a cotter key 64. An eye bolt 48 secured to the opposite end of the arm segment 76 from the offset member 78 provides a convenient means for coupling that end of the arm to the movable frame member 26 by means of a rigid linkage 50.

It is to be further noted that the arm segments 74 and 76 do not lie in the same plane, but instead, have their longitudinal axes inclined upwardly with respect to the horizontal. This precludes the end of the arm segment 76 from contacting the ground when the wheel 46 is in its retracted position.

The invention has been described herein in considerable detail, in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. In boat lift apparatus of the type having a generally horizontal stationary frame having spaced apart side members adapted to rest on a lake bottom or ground and a boat supporting means coupled to said stationary frame and adapted to be raised and lowered relative to said stationary frame by a winch mechanism, means for facilitating the movement of said boat lift apparatus on said lake bottom or ground comprising:
    (a) a pair of elongated arms pivotally connected at predetermined points along the length thereof to said spaced apart side members of said stationary frame of said boat lift;
    (b) wheel means journaled for rotation about an axis perpendicular to the longitudinal axis of said spaced apart side members at a point proximate a first end of said arms; and
    (c) means coupling the second ends of said arms to said boat supporting means of said boat lift, the arrangement being such that when said boat supporting means is raised relative to said stationary frame by said winch, said wheel means are positioned between said stationary frame and said lake bottom or ground.

2. Apparatus as in claim 1 wherein said elongated arms each comprise:
    (a) a rigid bar of a predetermined length having a first cylindrical projection extending perpendicularly to the longitudinal axis of said bar proximate one end thereof and a second cylindrical projection extending perpendicularly to the longitudinal axis of said bar at a point proximate the midpoint of said bar and in a direction opposite to said first projection; and
    (b) coupling means disposed at the other end of said bar.

3. Apparatus as in claim 2 wherein said wheel means comprises:
    (a) a tire mounted on a rim, said rim having a central aperture formed therethrough;
    (b) a tubular member having an inside diameter greater than the outer diameter of said first cylindrical projection on said rigid bar for receiving said first cylindrical projection;
    (c) a toroidal plate member affixed to and surrounding said tubular member and being perpendicular to the longitudinal axis of said tubular member; and
    (d) means for attaching said plate member to said rim with said tubular member extending through said central aperture.

4. Apparatus as in claim 3 and further including:
    (a) tubular elements affixed to said spaced apart side members with the axes of said tubular elements perpendicular to the longitudinal axes of said side members, said tubular elements adapted to slidingly receive said second projections for rotational movement therein.

5. Boat lift apparatus comprising, in combination:
    (a) a generally horizontal frame, having spaced apart side members, adapted to rest on a lake bottom or ground surface;
    (b) boat supporting means coupled to said frame and including a winch mechanism for raising and lowering said boat supporting means above said frame;
    (c) wheel means coupled to said frame for movement to raise and lower said frame with respect to said lake bottom or ground surface;
    (d) and means for releasably connecting said wheel means to said boat supporting means, so that operation of said winch mechanism causes said movement of said wheel means.

6. In boat lift apparatus of the type having a generally horizontal stationary frame having spaced apart side members adapted to rest on a lake bottom or ground and a boat supporting frame coupled to said stationary frame and adapted to be raised and lowered relative to said stationary frame by a winch mechanism, means for facilitating the movement of said boat lift apparatus on said lake bottom or ground, comprising retractable and extensible wheel means coupled to said side members of said stationary frame and adapted to be coupled to said boat supporting means so that when said boat supporting means is raised, said stationary frame is supported by said wheel means, and when said boat supporting means is lowered, said stationary frame is supported by said lake bottom or ground, said wheel means comprising:

(a) a pair of elongated arms, each having pivot means affixed thereto proximate its midpoint and an axle member affixed thereto proximate a first end thereof;

(b) a pair of wheels journaled for rotation on said axle members of said pair of arms;

(c) means securing said pivot means to said spaced apart side members; and (d) means coupling a second end of said pair of arms to said boat supporting means.

7. Apparatus as in claim 6 wherein said last named means comprises:

(a) a rigid link member pivotally coupled at one end thereof to said second end of said arms and removably pivotally coupled at a second point to said boat supporting means.

* * * * *